United States Patent [19]

Glibbery

[11] Patent Number: 4,696,359

[45] Date of Patent: Sep. 29, 1987

[54] ELECTRONIC WEIGHING APPARATUS

[75] Inventor: Albert W. Glibbery, Upland, Calif.

[73] Assignee: National Transducer Corporation, Rancho Cucamonga, Calif.

[21] Appl. No.: 899,487

[22] Filed: Aug. 22, 1986

[51] Int. Cl.$^4$ ........................... G01G 3/14; G01L 1/22
[52] U.S. Cl. .................................. 177/211; 73/862.67
[58] Field of Search ...................... 177/211; 73/862.67

[56]        References Cited
      U.S. PATENT DOCUMENTS 4,531,600  7/1985  Langlais et al. ............. 73/862.67 X Primary Examiner—George H. Miller, Jr.

Attorney, Agent, or Firm—Donald D. Mon; David O'Reilly

[57]        ABSTRACT

An electronic weighing apparatus providing accurate weight using a low level power supply. A force responsive strain gauge having a high impedance, provides an electrical output to a sample and hold circuit. The signal from the strain gauge is conditioned by a sequencing circuit which turns the strain gauge and sample and hold circuit on and off at a rate providing a very low duty cycle to keep power consumption to a low level. Power is supplied by a photo-voltaic panel built into the electronic weighing apparatus responsive in light levels as low as 50 lux.

15 Claims, 11 Drawing Figures

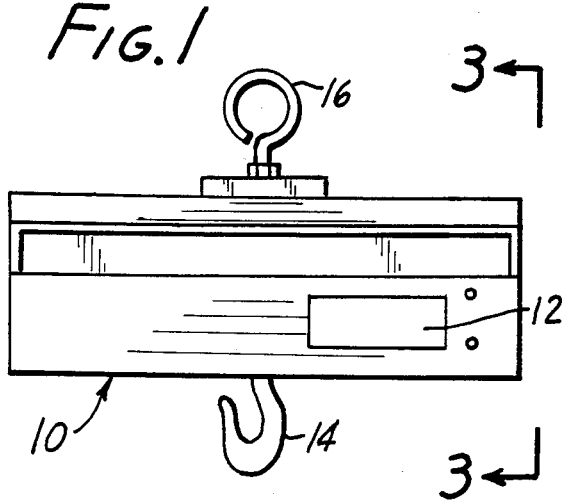
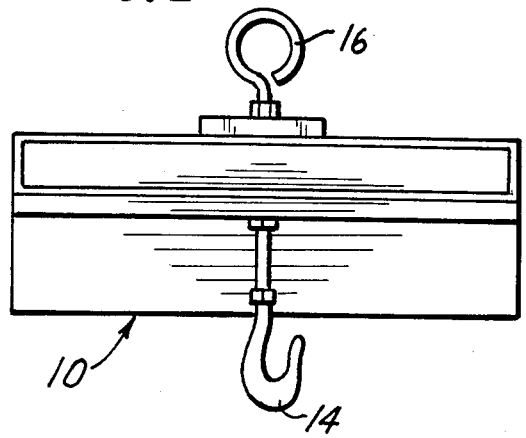
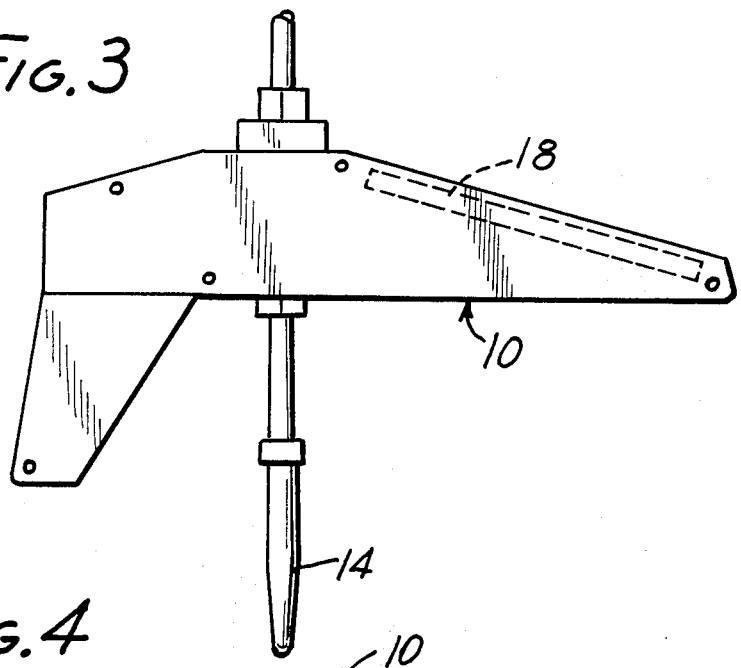
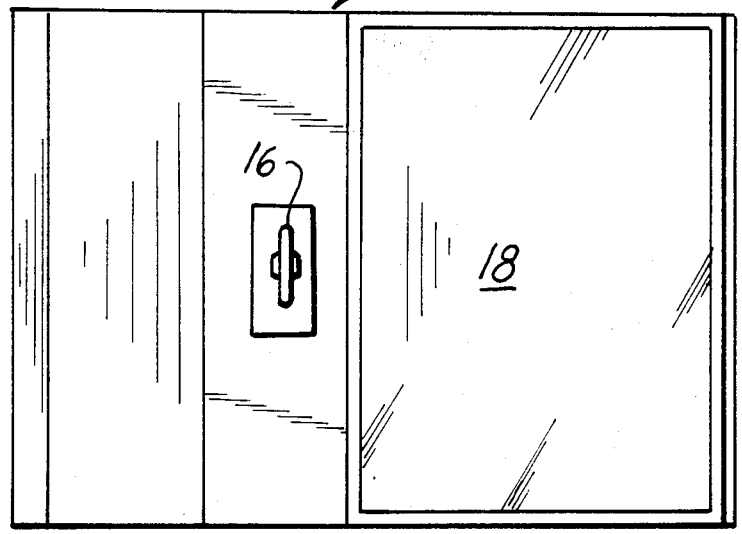

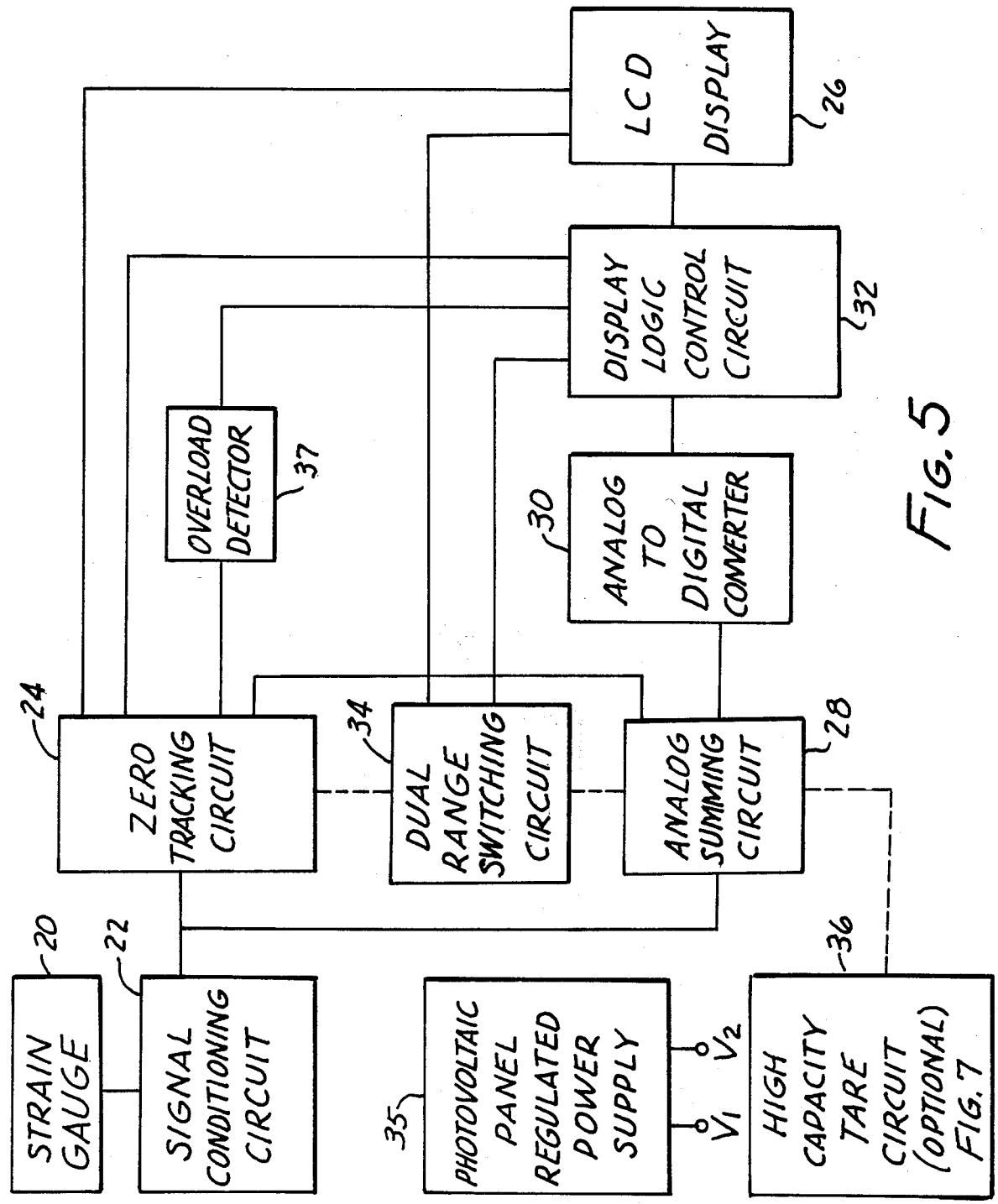

ELECTRONIC WEIGHING APPARATUS

FIELD OF THE INVENTION

This invention relates to electronic weighing devices, and especially to a weighing device that can be operated by power derived from photo-voltaic cells, even in areas of low light intensity.

BACKGROUND OF THE INVENTION

Because of their accuracy and convenience in use, electronic scales with digital readouts are a preferred type of scale, especially in markets where products are sold by weight. Typical scale installations are base-mounted scales atop display cases or in checkout stands, and hanging scales supported from the ceiling.

In base-mounted scales it is possible, but not desirable, to wire them into established electrical circuits to power them. Providing circuits to hanging type scales is considerably more complicated. Hanging electronic scales wired to permanent circuitry are essentially unknown in the marketplace.

The need to wire an electronic scale to permanent circuits can be circumvented by providing battery power instead. However, this seemingly obvious solution is not practical because of the large power demand of these scales as related to the capacity of commercial batteries. Surprisingly, in the course of routine use, a counter scale can readily exhaust a standard radio 9 volt battery in less than a day. This represents a serious operating cost for replacement batteries. Even worse, in stores which have large numbers of scales the inconvenience and distraction of continuously replacing batteries, combined with the labor cost of doing so, have made battery-powered scales, especially hanging scales, unattractive. Many larger stores have literally dozens of hanging scales, and continuously watching them to be certain they are all in working order is simply not practical. It is equally unattractive to have an out-of-service scale in full view, where and when a customer would wish to use it.

As an alternative to permanent power circuits or battery power, there is the photo-voltaic cell. However, prior to this invention they have been impractical for usage in electronic scales. The power generated by a photo-voltaic cell is a function of its area exposed to light, and of the intensity and wavelengths of the light incident upon it. The area that can be made available in a market is severely limited by surrounding structures, the need for clearance space around the scale, and by aesthetics. A very large array projecting widely from a scale, or a large free-standing array, would be absurd in a modern market. If a photo-voltaic array is to be used, it must be small enough to be integrated into the general envelope of the scale.

As a further complication, the light intensity in the modern market is relatively low. While many or most of them have large banks of overhead fluorescent tubes, still the luminous flux at eye-level is surprisingly low, although adequate to its purpose. The power capacity of a photo-voltaic cell must be matched to the requirements of the using circuit in the scale. The small available area and the low light level conspire to render known electronic scales inoperable with photo-voltaic cells, and in turn has frustrated the use of what should be the most attractive power source for a scale.

It is not only relatively small indoor scales which could profit from the use of this power source. Heavier installations, both indoors and outdoors, can profit from it, especially if accumulator means is also provided to store energy for use in periods of lesser or zero light, such as in the evening or at night.

Accordingly, it is an object of this invention to provide eletronic weighing apparatus whose demand for power is within the range of a sensibly-sized photo-voltaic array. Then all the complexities and complications of permanenet circuits and of batteries are avoided. Maintenance of the device is reduced to keeping the array clean, and installation problems to that of merely placing the scale where it is wanted.

It is another object of this invention to provide the many advantages of electronic scales, such as automatic zero compensation, tare entry, and unit of measure selection, in a low power configuration, so low in fact, that it can operate on power derived from relatively small photo-voltaic arrays operated in low intensity light installations.

BRIEF DESCRIPTION OF THE INVENTION

This invention is carried out in combination with a weight-reponsive structure whose deflection is proportional to load applied to it. Classical examples are delection beams incorporated in a base-mounted structure, or interposed between suspension means and a load receiving structure such as a pan. A strain-gauge is responsive to the condition of the weight-responsive structure, and is the sensor whose condition is read out as the value of the applied load. A liquid crystal display (LCD) is provided as a read-out means visible to the user of the scale.

Intermediate between the power source and the display is a calculator circuit adapted to respond to the condition of the strain gauge, and under power derived from the power source, cause the display to indicate the load on the scale.

According to a preferred but optional feature of the invention, the power source is a photo-voltaic cell (or array of cells).

According to the invention, the calculating circuit receives the output from the strain gauge through a switched amplifier to a sample and hold circuit. The sample and hold circuit is periodically activated by a sequencing circuit which provides a low duty cycle, well below 5%. Preferably the sequencing circuit activates the switching amplifier and sample and hold circuit for approximately 1 millisecond about 10 times a second for a duty cycle in the range of 1%. The output of the sample and hold circuit, is processed through an analog summing and switching circuit and converted to digital form. It is then displayed by a digital display.

An optional feature of the invention is a zero tracking circuit which automatically and continuously compensates for contamination or residue build up on the weighing container or platform. As contamination, dirt and grime build up on the scale platform, the zero tracking circuit automtically compensates by recalibrating the scale to zero.

As a further option, a dual range circuit automatically switches to a lower digital resolution when the weights exceed a predetermined amount. For example, scale weights above a preselected value cause the dual range circuit to switch the accuracy from a high resolution output or a low resolution output.

For high capacity scales, an optional tare circuit may be provided to recalibrate the weighing scale to compensate for the tare weight of a container. The tare circuit has a plurality of counters providing an input to the analog summing and switching circuit. Pushbutton switches allow rapid input of the tare weight of the container.

According to yet another preferred but optional feature of the invention, storage capacitors may be provided to accumulate power for later use.

The above and other features of this invention will be fully understood from the following detailed description and the accompanying drawings, in which:

BRIEF DESCRIPTION OF THE DRAWINGS

FIG. 1 is a front elevation of a hanging scale constructed according to the invention.

FIG. 2 is a rear view of the hanging scale of FIG. 1.

FIG. 3 is a side view of the hanging scale taken at 3—3 of FIG. 1.

FIG. 4 is a top view of the hanging scale of FIG. 1.

FIG. 5 is a block diagram illustrating the operation of the weighing scale.

DETAILED DESCRIPTION OF THE INVENTION

Figure 6A:
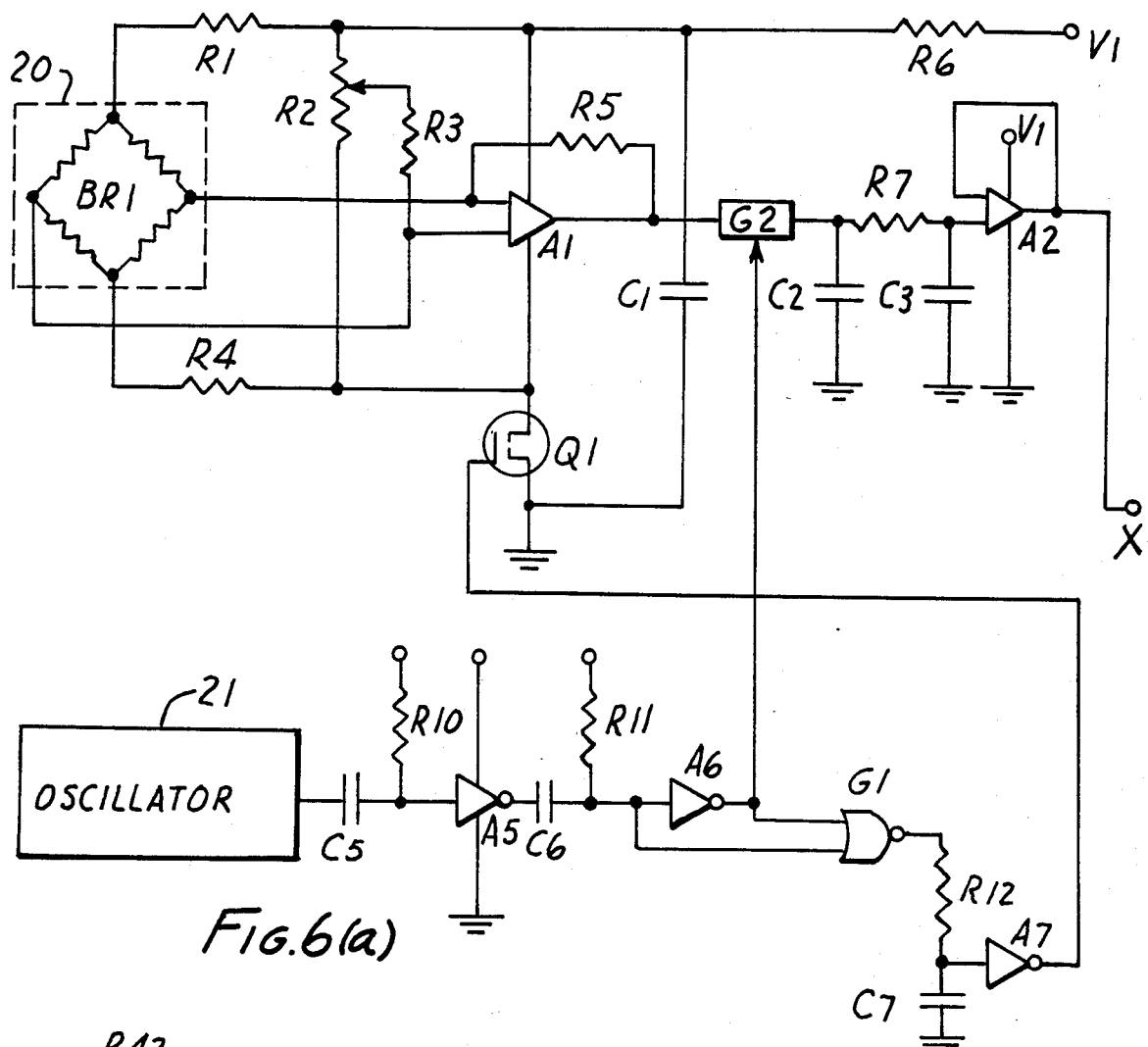
FIGS. 6(a), 6(b) and 6(c) is a schematic diagram of the electronic circuit of the invention.

While this invention is useful in many types of installations, both base-mounted on a counter or on other furniture, it is best illustrated as part of a hanging scale. This means of illustration is selected for convenience in disclosure, and is not limiting as to the scope of the invention.

A hanging scale 9 incorporating the invention is shown in FIGS. 1-4. It includes a housing 10, a digital display 12 and a hook 14 for suspending weighing pan or container (not shown). Eye bolt 16 is provided for hanging the scale from a chain or cable dropped from the ceiling.

Power for a liquid crystal digital display (LCD) 12 and the electronic circuitry of the scale is provided by a photo-voltaic panel 18 mounted in an upper surface of the housing 10. It is positioned where it will receive ambient light. The photo-voltaic panel 18 provides an output in the range of 6–12 volts to power the electronic circuitry.

The electronic circuitry is illustrated in the block diagram of FIG. 5. It is comprised of strain gauge transducer 20, signal conditioning circuit 22 receiving the output from the strain gauge, and zero tracking circuit 24 for automatic recalibration of LCD display 26. Also included in the circuit is analog summing circuit 28 receiving the output from signal conditioning circuit 22 for delivery to analog to digital converted (A/D) 30 which operates display logic 32 for controlling the operation of the segments of LCD display 26. Power supply 35 uses the output of the photo-voltaic panel, as will described in greater detail hereinafter.

Optional circuits include a dual range switching circuit 34 for changing the range of the resolution of output LCD display 26 from two significant decimal places to one when the samples exceed a certain range. For example, above a selected value dual range switching circuit 34 will automatically change the output of analog summing circuit 28 and the range of LCD display 26.

Another optional circuit is tare circuit 36 for providing tare weights for high capacity scales. This circuit permits adjusting the zero point for the tare weight of a container and will be described in greater detail hereinafter.

Power consumption with industry standard strain gauge load cells on the order of hundreds of ohms is much too high for a low level power supply such as provided by those which use a photo-voltaic source. Therefore some method is required to signal condition a load cell with the low level power available. The solution to the use of a low level power supply is to reduce power consumption by creating a high impedance strain gauge load cell on the order of several thousand ohms in combination with a unique signal conditioning circuit configured to operate at the low power levels required.

Figure 6B:
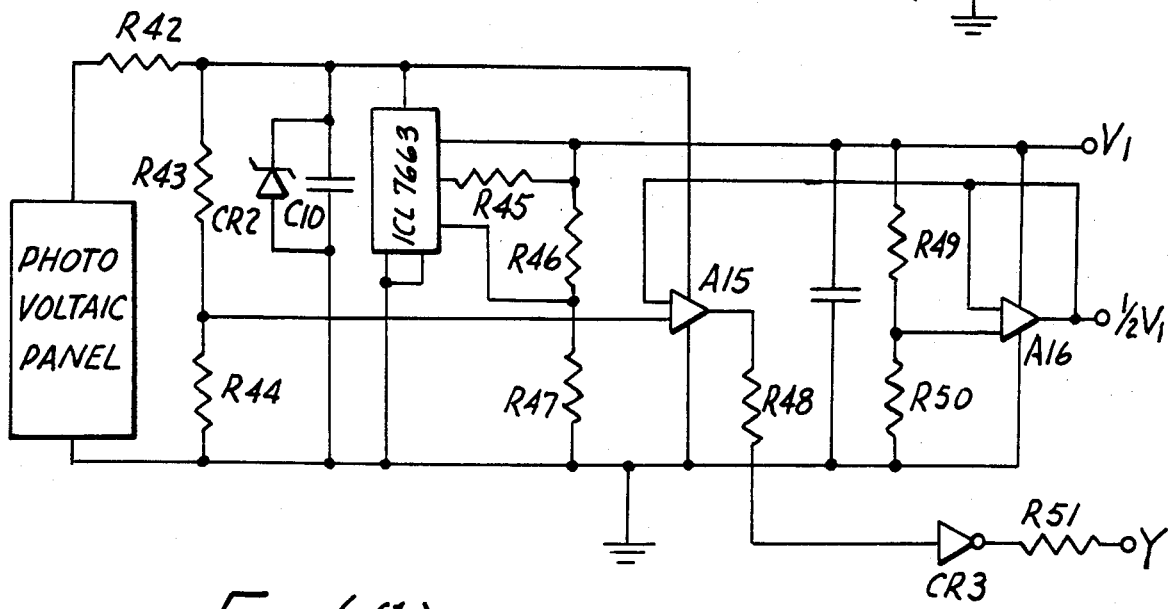
Figure 6C:
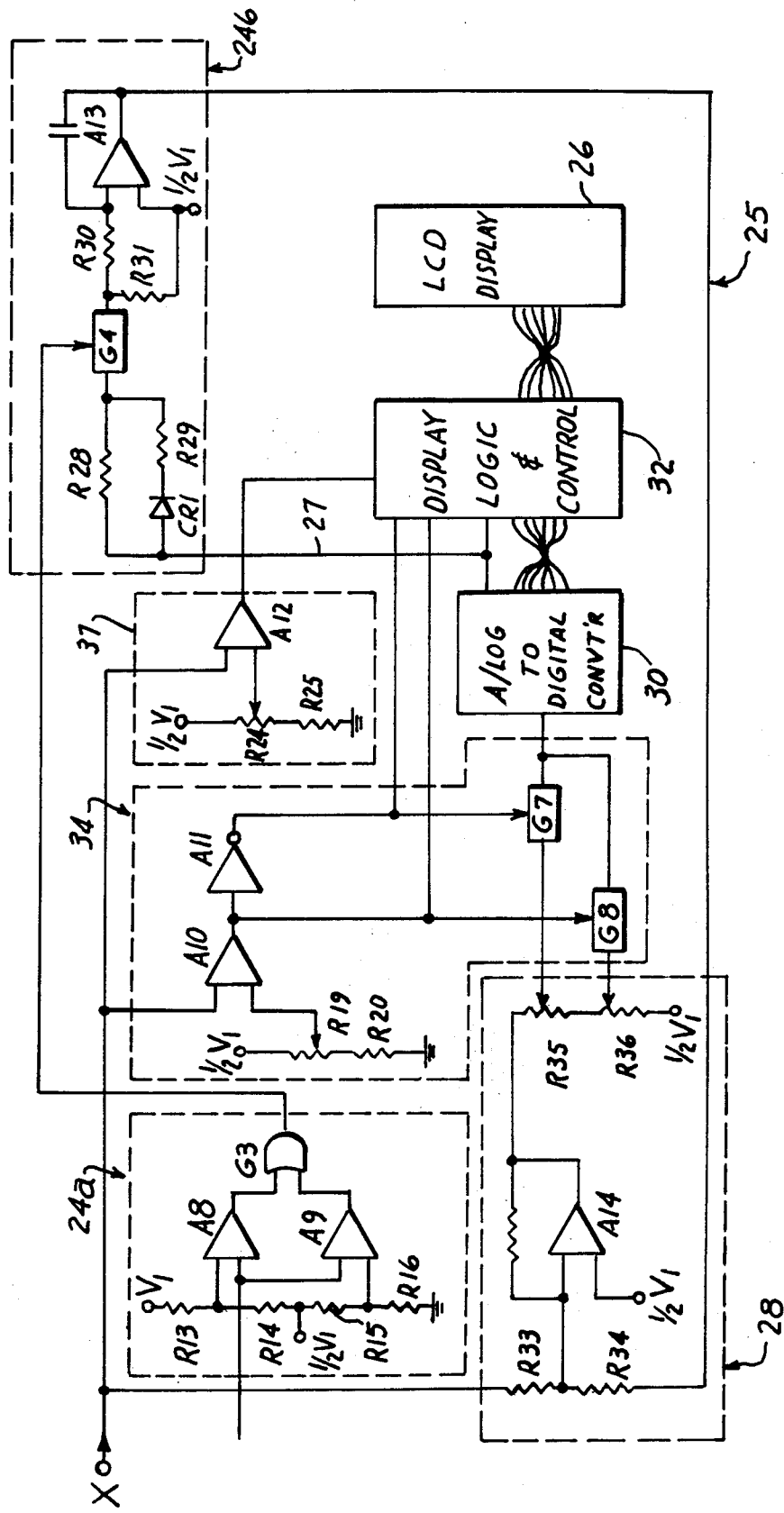

The unique circuit and strain gauge are illustrated in the schematic of FIGS. 6(a) through 6(c). The first step to reducing power consumption is to create a strain gauge impedance bridge 20 (BR1) having an impedance on the order of 5000 ohms. Having load cell 20 at this higher impedance will substantially reduce power consumption by reducing current requirements.

Power consumption is further reduced by using a unique signal conditioning circuit 22 which has three parts excluding stain gauge 20. These three parts are switched amplifier A1, sample and hold circuit A2 which includes sequence logic circuit A7, and gate G1. While some of the circuits disclosed and described hereinafter are not present in all embodiments the signal conditioning circuit 22 will be. The latter circuit is unique in that power consumption is kept to a minimum by operating the switched amplifier and strain gauge impedance bridge 20 at a very low duty cycle of less than 5% and preferably less than 1%.

The switched amplifier is comprised of amplifier A1 in combination with the resistors R1-5, transistor Q1, and the capacitor C1. Switching transistor Q1 turns amplifier A1 on and off at a relatively low duty cycle rate. The relatively small millivolt signal from stain gauge impedance bridge 20 is amplified by switching amplifier A1 up to a level at least one hundred times greater at the output of the amplifier. The output of switched amplifier A1 is applied to sample and hold circuit comprised of amplifier A2, resistor R7, capacitors C2 and C3 and gate G2. The output of switched amplifier A1 is applied to amplifier A2 of the sample and hold circuit each time gate G2 is switched by a sequence logic circuit.

A sequence logic circuit is comprised of oscillator 21 through amplifiers A5 through A7, gate G1 and its associated resistors and capacitors R12 and C7. The sequence logic circuit turns on for approximately 800 microseconds approximately 10 times a second. That will result in a duty cycle of 1% or less or approximately 0.8%. A duty cycle of less than 5% is preferred.

Downstream from oscillator 21 the resistor network of R10 and C5 takes the leading edge of the oscillator output and produces a pulse of approximately 400 to 500 microseconds from that pulse. Beyond A5 a second R-C network produces a second pulse of approximately 400 microseconds, resulting in two 400 microsecond pulses in length with one occuring immediately after the other at a repetition rate of approximately 10 times a second. One of the pulses is applied through gate amplifier A6 to gate G2 to turn on the sample and hold circuit. The two pulses are also gated together at gate G1 to produce a period of time, or a window in time, approximately 800 microseconds in length.

The latter pulse is applied to transistor Q1 to turn switched amplifier A1 and strain gauge impedance bridge 20 on. In the latter 400 microseconds of the 800 microseconds, sampling gate G2 is turned on so that the analog output of switching amplifier A1 is present for 400 microseconds and applied to the sample and hold circuit comprised of amplifier A2, resistor R7 and capacitors C2 and C3. The sample and hold circuitry sustains whatever voltage was presented to it during the 400 microsecond period, which is comprised of an analog signal at the output of amplifier A2 indicated at X, which remains there continuously.

The analog signal output of this signal conditioning circuit indicated at X in FIG. 6C, is processed by zero tracking circuit 24a, 24b and analog summing circuit 28, fed to analog to digital converter (A/D) 30 for display on liquid crystal display (LCD) 26.

The analog signal (x) output of signal conditioning circuit 22 is processed by zero tracking circuit 24a, 24b and analog summing circuit 28 shown schematically in FIG. 6(c). Zero tracking circuit 24 will adjust or automatically correct for a buildup of contaminants particularly on hanging scales. Contaminants may be mud or a sticky residue from produce. Since some scales have a resolution as high as two decimal places (hundredths of a pound), it is not long before accumulation of residue and contamination start to effect the accuracy of the scale. In fact it is quite possible for the accumulation to exceed a hundredth of a pound to perhaps as much as two to three hundredths of a pound if the produce being weighed is wet and dirty. The accumulation usually occurs over a relatively long period of time and the correct thing to do to maintain accuracy in weighing is to continuously advance the zero tracking to null out the signal resulting from accumulation of contamination on the pail hanging from the scale. Zero tracking window detector circuit 24a continuously samples the small amounts of contamination weight in the order of less than a hundredth of a pound or a relatively few hundredths of a pound and provides an output to zero tracking integrator circuit 24b when the contamination limits are above or below a predetermined amount. This continuous sampling is done automatically over a long period of time. In the embodiments shown the zero tracking circuit tracks out approximately one hundredth of a pound approximately every three to four minutes, which has been determined to be approximately the optimum period of time for this purpose. Thus, when the zero tracking circuit detects this accumulation zero tracking intregator 24b will produce an output indicated at 25 to summing circuit 28 to automatically adjust the zero point to compensate.

However, at some point whether it be daily or every few days there is a good possibility that the pail hanging on the scale will be cleaned and put back on the scale. The accumulation will have been removed rapidly, and would result in a scale reading becoming less than zero or negative. However, zero tracking window detector circuit 24a will recognize at once that the reading has become negative to just a fraction of a hundredth of a pound or no more just a few hundredths of a pound. It will automatically respond by causing an output from zero tracking integrator 24b adjusting the scale back to zero when the pail is remounted. The adjustments for negative or positive readings are non-symetrical in that negative readings will be rapidly readjusted to zero as opposed to positive readings which it will adjust more slowly.

Zero tracking window detector circuit 24a is comprised of amplifiers A8 and A9 and associated circuitry whose response time and sensitivity are adjusted to provide the upper and lower limits. The outputs of these amplifiers are gated through gate G3 and gate G4 in zero tracking integrator 24b for processing by amplifier A13. The correction signal indicated at 2 is applied to the analog summing circuit 28 through resistor R34 to summing amplifier A14. The analog output of amplifier 14 is applied through a resistor network to analog to digital convertor 30. Zero tracking integrator circuit 24b negative indicator output indicated at 27 is also applied to display logic control circuit 32 and LCD display 26 to correct for these minor errors due to contamination accumulation and after removal.

Zero tracking window detector circuit 24a is comprised of comparators A8 and A9 receiving and input from series resistors R13, R14, R15 and R16 which provide outputs to gate G3. Zero tracking range is provided by adjusting the sensitivity of comparators A8 and A9. Adjustment of the sensitivity of all comparators determines whether the range of zero tracking should be several hundredths of a pound, or a smaller increment. Comparators A8 and A9 and gate G3 determine whether zero tracking will be applied and at what point it will no longer apply zero tracking.

The output of gate G3 goes to analog gate G4 in zero tracking integrator 24b which essentially enables or disables zero tracking. Zero tracking is accomplished by a stable integrator comprised of amplifier A13 and its associated circuitry receiving an input through gate G4. The zero tracking output indicated at 25 is applied to analog summing circuit 28 to correct for accumulation of contamination on the weighing scale.

A unique feature of the zero tracking circuit is its rapid adjustment for negative tracking and rather slow adjustment for postive adjustments where the accumulation occurs over a period of time. Thus, because the accumulation change to a negative state is rapid the circuit will quickly adjust to zero while for the slower positive readings from long term accumulation of the adjustment will be more gradual.

Overload detector 37 in the form of an analog comparator A12 also receives analog output (X) from the signal conditioning circuit to flag an overload on the display should the weight exceed the range of the scale.

The output of overload detector 37 is a step function which is applied to display logic control circuit 32 to interrupt the LCD display and show an overload code.

Overload indication is provided by overload detector circuit 37 which is an analog comparator comprised of amplifier A12 which decides when the analog signal from the signal conditioning circuit is too large and provides an output to LCD display 26 to flag an overload should the weight exceed the range of the scale. Because in some embodiments the weight can range from small to very large, dual range switching circuit 34 is provided.

Dual range switching circuit 34 is comprised of amplifiers A10 and A11 and associated circuitry which also receives the analog output of the signal conditioning circuit and determines whether it is too large for the high resolution ranges of the display. If the weight on the scale produces an output which exceeds the high resolution range the dual range switching circuit then switches the output to a low resolution range. Dual range switching circuit 34 is a comparator which manipulates analog gates G7 and G8 to analog summing circuit 28. That is, the dual range switching circuit turns one or the other of gates G7, G8 on to decide which analog output from the analog summing circuit is to be delivered to analog to digital converter 30.

Analog summing circuit 28 receives the analog signal (X) from the signal conditioning circuit and sums it with a signal received from the zero tracking circuit indicated at 25. It is comprised of amplifier A14 and associated circuitry which provides an output to resistors R35 and R36 from which an output to analog to digital converter 30 is selected by gates G7, G8. Gates G7 and G8 select the output according to the signal from dual range switching circuit 34. For single range high resolution scales dual range switching circuit 34 may be defeated by connecting the output summing amplifier A14 directly (not shown) to analog to digital converter 30.

With the unique circuit design shown, a low level power supply having a photo-voltaic cell as a power source can be used as shown in FIG. 6B. A photo-voltaic panel is connected to a conventional power supply circuitry to provide outputs at V1 of approximately 6 volts and at V2 of approximately +3 volts. The photo-voltaic panel is an array having a sensitivity permitting operation at light levels as low as 150 lux. In normal light levels of 300 to 400 lux the panels provide from 8-12 volts at 180-200 microamps. These power levels are sufficient for the high impedance (5000 ohms) strain gauge and low duty cycle circuit designed to be used with it.

The scale system preferably uses a 3½ digit liquid crystal display operated by display logic control circuit 32 receiving outputs from analog to digital convertor 30, overload detector 37 and zero tracking circuit 24. Display logic control circuit 32 is comprised of a bank of CMOS analog gates, having one gate for each display segment of LCD display 26 receiving an input from analog to digital convertor 30.

Figure 7:
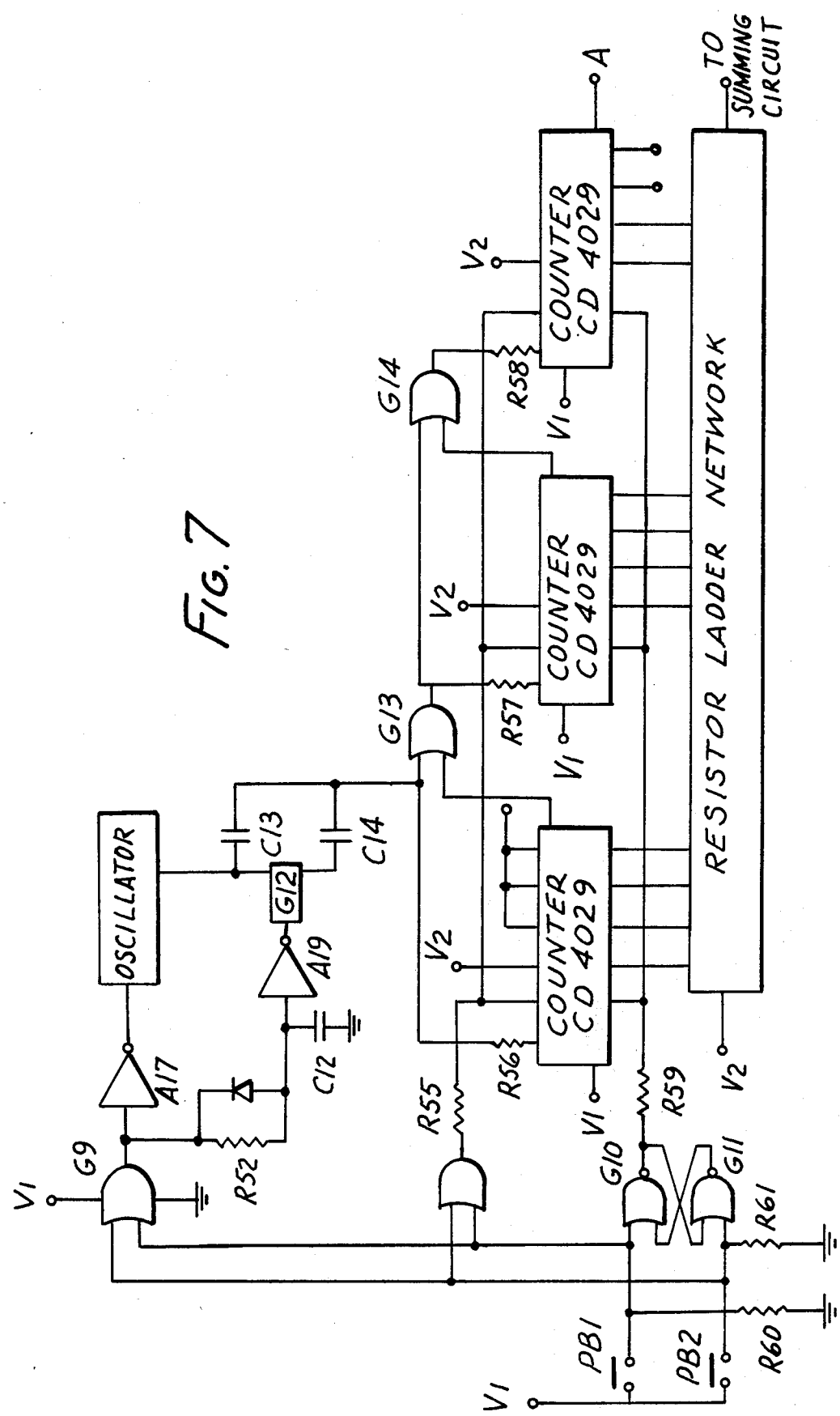
FIG. 7 is a schematic diagram of a tare circuit for use for high capacity weighing scales.

An optional tare circuit for high capacity scales is shown in FIG. 7. The tare circuit is for use on high capacity scales that are in the 200 pound or 200 kilogram range for warehouse and market scales. Tare circuit 36 is a manually activated up/down counter operated by push button switches PB1 and PB2. The up/down range of tare circuit 36 is set by operating push button switches PB1 or PB2 to increase or decrease the count which works into resistive ladder network 40. The push button switches can set the counter incrementally or at a faster pace by holding down either of the switches to increase or decrease the set when either one or the other of switches PB1, PB2 are held down. Momentary activation of these switches will increase or decrease the output to up/down counters incrementally. Simultaneous operation of both pushbutton switches PB1 and PB2 will reset the tare weight to zero.

The output of tare set circuit 36, when used, is applied to analog summing circuit 28 for summing with the output of the signal conditioning circuit. This circuit allows tare weights to be set manually to offset the weight of a container used in high capacity scales.

There are two ways to use tare set circuit 36. Push button switches PB1 and PB2 provide for addition of up or down counts so an operator can enter the weight of a container. If it is desired to determine the weight of some material in a container which is not readily transferable to another container one uses the tare circuit 36 to enter the weight of the container. This is done by activating push button PB1 or PB2 and observing the display. When the display reaches the actual weight of the container, the switches are released, setting the display for the container weight. When the container is placed on the scale the operator can directly read the weight of its contents. Activation of push button switches PB1 and PB2 simultaneously will reset tare set circuit 36 to zero.

It is not necessary that weighing apparatus according to this invention utilize photo-voltaic cells as a power source. It is a considerable and unique advantage that it can. However, if for some reason one wishes to supply it from a hard-wired circuit, or from a battery, it is readily adapted to the purpose. When so used, it still provides the advantages of low power consumption, and the various special features of which have been described.

Also, accumulator means other than the capacitor described herein can be used to store energy for later use. For example, storage batteries can be provided. This invention does provide, in the capacitance storage, a convenient, small envelope structure which does not require maintenance or replacement.

The circuitry shown herein is readily packaged in a small bulk so it can fit into relatively small scales without requiring enlargement of structure which one commonly expects to encounter. Also, because of the low power requirements, a relatively small photo-voltaic cell array can be used, even in fairly dimly lighted areas. An exposed area of not more than about 25-50 square inches will ordinarily be adequate, and this can be placed on surfaces which are not in the way, or asthetically objectionable.

Figure 8:
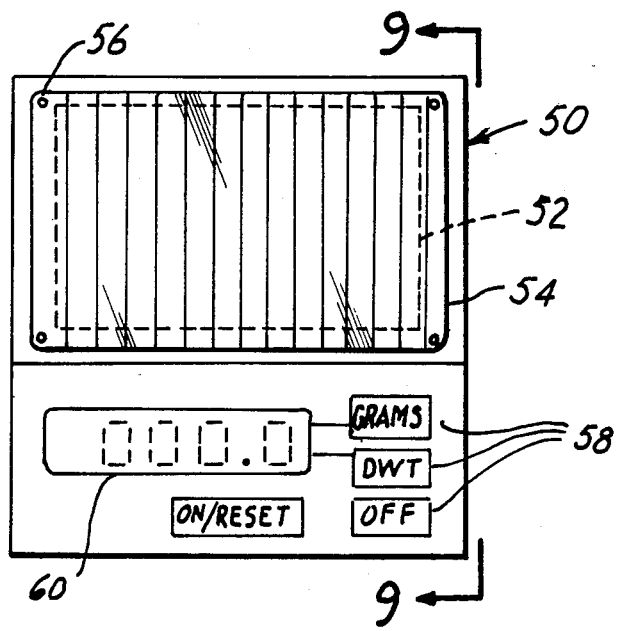
FIG. 8 is a top view of a base-mounted scale.
Figure 9:
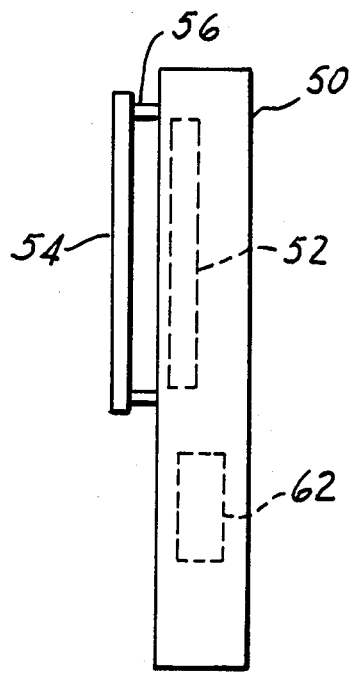
FIG. 9 is a side view of the base-mounted scale of FIG. 8.

For example in a small portable laboratory scale 50 shown in FIG. 8 a small photo-voltaic display 52 may be incorporated beneath weighing platform 54 constructed of any suitable transparent material such as plastic or glass. This is a unique solution to the problem of where to put the photo-voltaic panel while maintianing the aesthetic appearance of a small portable scale. The platform 54 is supported by beam deflecting posts 56 at each corner. The portable platform scale has operating on, off, scale change and re-zero switches 58 and LCD display 60 built into the unit to provide extreme accuracy in weighing laboratory samples.

Another unique feature of the portable scale which allows incorporation of the photo-voltaic panel conveniently beneath the platform is the use of rechargable capacitor pack 62. A rechargeable battery is unacceptable because of their requirement of a certain threshhold level of current to charge the battery. Capacitor pack 62 of perhaps three series connected capacitors requires no threshhold level and providing there is some light falling on photo-voltaic panel 52 sufficient to allow it to reach its essentially open circuit voltage, which it does at about 50 lux or slightly less, it will reach normally about 12 volts with no load on it and will charge the capacitor pack 62. Therefore, all the time portable scale 50 is not in use it is charging capacitor pack 62 and storing power. This power is always available to drive the electronic circuits of FIGS. 6(a)-(c) even when a sample is placed on platform 54 which essentially obscures all light from photo-voltaic panel 52.

The capacitor pack 62 is a permanent component having a characteristic essentially like an electrolytic capacitor except they are nonpolarized. They exhibit up to a certain level of charge characteristics very similar to aluminum electrolytic capacitors and exhibit a rather large amount of dielectric absorbtion. They are intended of course just to be storage capacitors for temporary storage of power. A suitable capacitor for this purpose is known by the name of Maxcaps manufactured by the Sohio Company.

The described circuitry thereby makes available, and even aesthetically attractive, technology which enables digital readout in self-contained and self-sufficient scales which scales are free from the problems of electrical wiring or of surveillance and maintenance of the power supply.

This invention is not to be limited by the embodiments shown in the drawings and described in the description, which are given by way of example and not of limitations, but only in accordance with the scope of the appended claims.

I claim:

1. A weighing apparatus comprising:
   force responsive strain gauge means providing an electrical output;
   said force responsive strain gauge means having a high impedance;
   sample and hold circuit means receiving the output from said force responsive transducer means for sampling and holding said output;
   sequencing means for sequentially turning said force responsive strain guage means and said sample and hold means on and off;
   digital processing means for processing the output of said sample and hold means;
   display means for displaying the output of said digital processing means; and
   low voltage power supply means supplying power to said force responsive transducer and to said sample and hold circuit means.

2. Apparatus according to claim 1 wherein said high impedance force responsive transducer means is a high impedance bridge.

3. The apparatus according to claim 2 wherein said high impedance bridge has an impedance in the range of 4000 to 6000 ohms.

4. The apparatus according to claim 2 in which the duty cycle in said sequencing means is in the range of 1% to 5%.

5. The apparatus according to claim 2 in which the duty cycle of said sequencing means is approximately 1%.

6. The apparatus according to claim 1 in which said low level power supply means is a light responsive power supply means producing a low level power output.

7. The apparatus according to claim 6 with said light responsive power supply means is a photo-voltaic panel means.

8. The apparatus according to claim 1 in which said sequencing means sequences said sample and hold means on and off at a duty cycle in the range of 1% to 10%.

9. The apparatus according to claim 1 in which said digital processing means includes;
   a summing circuit receiving output of said sample and hold means;
   analog to digital converting means receiving the output of said summing circuit; and
   display logic means receiving the output of said analog to digital converting means to drive said display means.

10. The apparatus according to claim 9 including zero-tracking means; said zero-tracking means continuously sampling small amounts of contamination weight on a weight container on said scale; the output of said zero-tracking circuit being connected to said summing circuit to re-adjust the display to zero periodically.

11. The apparatus according to claim 9 including; a dual range switch cavity; said dual range switching circuit receiving the output of said sample and hold circuit and providing an output to said summing circuit to switch said summing circuit to or from a high resolution to a low resolution when the weight on the scale exceeds a predetermined amount.

12. The apparatus according to claim 11 in which said dual range switching circuit switches the output of said display to or from a two decimal point resolution to a single decimal point resolution.

13. The apparatus according to claim 9 including a tare circuit for adding the tare weight of a container.

14. The apparatus according to claim 13 in which said tare circuit comprises; switch means for inserting up or down counts to the display.

15. The apparatus according to claim 14 in which said switch means comprises a pair of pushbutton switches; an up/down counter activated by said pushbutton switches; said pushbutton switches being connected to reset said tare circuit to zero when activated simultaneously.

* * * * *